(12) United States Patent
Albin

(10) Patent No.: US 9,145,192 B1
(45) Date of Patent: Sep. 29, 2015

(54) SYSTEM AND METHOD FOR ATTACHING A TRANSDUCER TO A VESSEL

(71) Applicant: Jackie Albin, Clinton, MO (US)

(72) Inventor: Jackie Albin, Clinton, MO (US)

(*) Notice: Subject to any disclaimer, the term of this patent is extended or adjusted under 35 U.S.C. 154(b) by 61 days.

(21) Appl. No.: 14/201,808

(22) Filed: Mar. 8, 2014

Related U.S. Application Data

(60) Provisional application No. 61/780,072, filed on Mar. 13, 2013.

(51) Int. Cl.
*A47F 5/00* (2006.01)
*B63B 49/00* (2006.01)
*G01S 15/02* (2006.01)

(52) U.S. Cl.
CPC .................. *B63B 49/00* (2013.01); *G01S 15/02* (2013.01); *B63B 2221/08* (2013.01)

(58) Field of Classification Search
CPC ................... Y10T 29/49826; Y10T 29/49016; F16M 13/00; F16M 11/10; F16M 13/02; F16M 13/022
See application file for complete search history.

(56) References Cited

U.S. PATENT DOCUMENTS

| | | | |
|---|---|---|---|
| 4,784,074 A | | 11/1988 | Michalak |
| 4,938,165 A | * | 7/1990 | Williams et al. .............. 114/343 |
| 5,016,225 A | * | 5/1991 | Blomberg ..................... 367/173 |
| 6,018,923 A | * | 2/2000 | Wendt ............................ 52/712 |
| 6,474,901 B1 | * | 11/2002 | Thurston ...................... 403/381 |
| 6,928,948 B1 | * | 8/2005 | Shannon ....................... 114/343 |
| 7,918,054 B2 | * | 4/2011 | Grafton et al. ................ 52/92.3 |
| 8,879,361 B2 | * | 11/2014 | McGee ......................... 367/173 |
| 8,882,068 B2 | * | 11/2014 | McGee ......................... 248/300 |
| 2012/0187261 A1 | * | 7/2012 | Cicero .......................... 248/201 |

\* cited by examiner

*Primary Examiner* — Shin Kim
(74) *Attorney, Agent, or Firm* — David E Herron, II

(57) ABSTRACT

The disclosure describes system for mounting a transducer to a surface of a vessel, and also a method of mounting a transducer to a surface of a vessel. inventive system includes a base having walls that bound an interior void. Flanges extend over the interior void and define a channel, and a slide bracket having a rod passing therethrough such that the slide bracket slides within the channel. The method includes the steps of providing a base with walls and flanges, and mounting a slide bracket to a channel formed within the base.

15 Claims, 4 Drawing Sheets

# SYSTEM AND METHOD FOR ATTACHING A TRANSDUCER TO A VESSEL

FIELD AND BACKGROUND OF INVENTION

The invention is a system for mounting a transducer to a surface of a vessel, and is also a method of mounting a transducer to a surface of a vessel. Transducers are well-known in the art, particularly by fishermen and boatsmen. A transducer emits a signal, usually a sound wave, which bounces of an object and returns to the transducer. The transducer detects the distance a wave travels before it returns, thereby enabling the transducer to provide the location of a lake bottom, sunken trees, or other objects (such as fish) that are near the boat.

Typically, transducers are positioned near the hull of a vessel, usually on a rearmost surface of the boat. Generally, the transducer is positioned adjacent the water line, preferably beneath the water line. If a boat brushes over an obstruction, such as a log or stump in the water, the obstruction may collide with a well-mounted transducer. These collisions lead to loss or damage of a transducer. The best mode of using the inventive system is to reduce damage or loss of a transducer.

SUMMARY OF INVENTION

The invention is both a system for mounting a transducer to a surface of a vessel as well as a method of mounting a transducer to a vessel.

The Inventive System

The inventive system for mounting a transducer includes a base adapted to engage the surface of the vessel. The base has edges that define a longitudinal axis, a left side wall extending outwardly from a location adjacent a left edge of the base, and a right side wall extending outwardly from a location adjacent a right edge of the base, a bottom wall extending outwardly from a location adjacent a bottom edge of the base. The bottom edge has a bottom hole positioned centrally thereon. In like manner, the top wall has a top hole positioned centrally thereon as well.

Additionally, the invention will also include a top wall extending outwardly from a location adjacent a top edge of the base. An interior void is formed and bound by the base and the walls.

A left inward flange extends from a top of the left side wall, and at least partially covers the interior void. In like manner, a right inward flange extends from a top of the right side wall, and at least partially covers the interior void as well. A channel is thereby formed in a space between the left inward flange and the right inward flange.

The inventive system also includes a slide bracket that is displaceable within the channel. The slide bracket has an upper portion and a lower portion, and the upper portion of the slide engages above the left flange and the right flange. Moreover, the lower portion of the slide bracket fits inside the void. The slide further includes an aperture formed therein that passes therethrough.

The system will also include a rod that passes through the aperture in the slide bracket, and the top end of the rod being fits within the top hole, and the bottom end of the rod fits within the bottom hole. As such, the rod passes through channel and also through the slide bracket, and is configured to retain the slide bracket within the channel.

In a preferred embodiment of the inventive system, the rod passes through a hollow center portion of a compression spring. In this embodiment, the spring engages the top wall at one end, and the slide bracket at its other end. The spring, therefore, biases the slide bracket toward the bottom wall.

For example, the invention may include a pair of claws extending outwardly from the top portion of the slide bracket. The transducer may be coupled to each of the pair of claws.

The system may be attached to the vessels by using screws. In this embodiment, the system includes a plurality of screws, and also includes a plurality of screw holes formed in the base. The system is attached to the surface of the vessel by passing the screws through the holes and into the surface of the vessel. The system may also include a shock-absorbing gasket positioned between the base and the surface of the vessel.

The Inventive Method

The invention is also a method of mounting a transducer to a surface of a vessel. The inventive method includes the steps of forming a base adapted to engage the surface of the vessel, and extending a left side wall outwardly from a location adjacent a left edge of the base, and extending a right side wall outwardly from a location adjacent a right edge of the base.

The method also includes the steps of extending a bottom wall outwardly from a location adjacent a bottom edge of the base, and forming a centrally-positioned hole on the bottom wall. A top wall extends outwardly from a location adjacent a top edge of the base, and the method also includes the step of making a hole in a central position of this top wall. An interior void is bound by the base and the walls.

The inventive method also includes the steps of forming a left inward flange to extend from a top of the left side wall, and at least partially cover the interior void. Analogously, the method also includes forming a right inward flange to from a top of the right side wall, and at least partially cover the interior void, thereby forming a channel in a space between the left inward flange and the right inward flange.

The method further requires one to provide a slide bracket with an upper portion and a lower portion, and forming the upper portion of the slide bracket to engage above the left flange and the right flange, and positioning the lower portion within the void. Of course, the invention also requires one to form an aperture in the slide bracket.

Additionally, one must pass a rod through the channel by inserting the top end of the rod into the top hole and the bottom end of the rod being in the bottom hole, and also pass the rod through the aperture in the slide bracket.

Optionally, the invention may include the step of passing the rod through a hollow center of a compression spring, thereby biasing the slide bracket toward the bottom wall. In this embodiment of the method, a top of the spring engages the top wall and a bottom of the spring engages the slide bracket.

The invention may also include the step of positioning a transducer on the slide bracket; for example one may extend a pair of claws outwardly from the top portion of the slide bracket, then couple the transducer to each of the pair of claws.

Optionally, one may form screw holes in the base, and attach the system to the vessel by passing screws through the screw holes and into the surface of the vessel.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
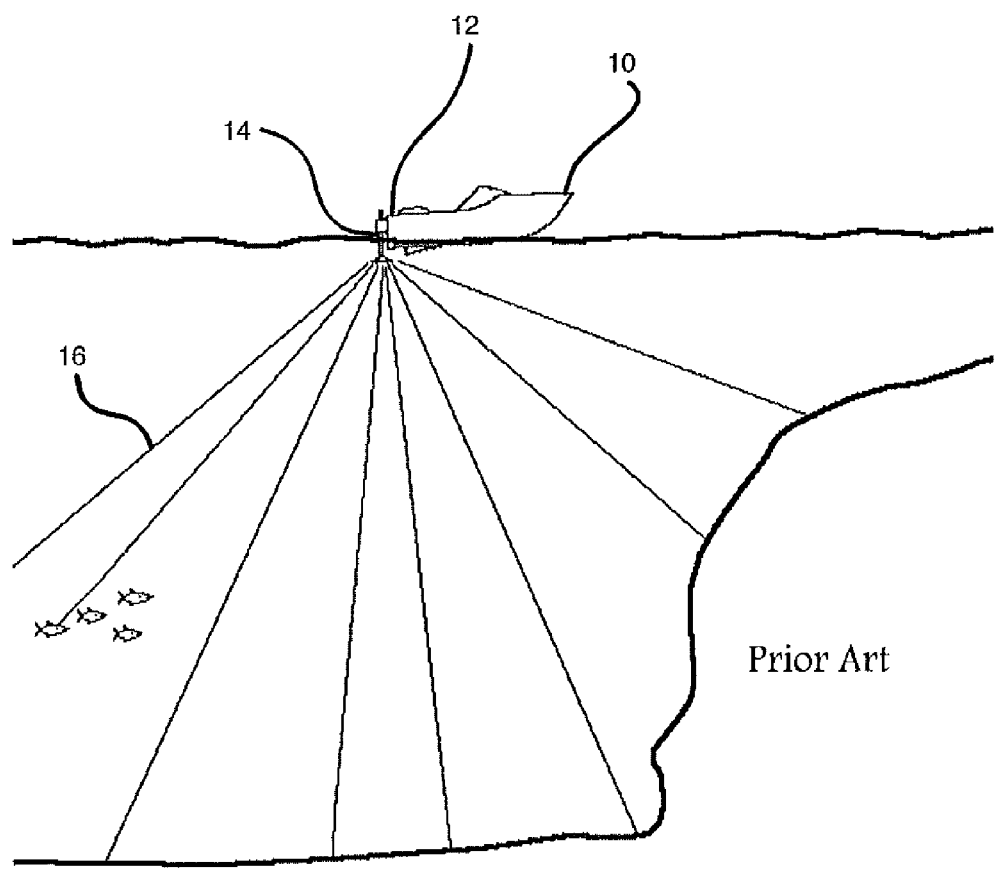
FIG. 1 shows a vessel using a transducer of the prior art.

FIG. 1 shows a perspective view of a boat 10 having a transducer 14 mounted adjacent a hull 12 of the boat 10. As the boat 10 rest atop the water, at least a portion of the boat sinks below the water line. The transducer 14 is usually mounted so that it is adjacent the water line, or is slightly under water.

Still referring to FIG. 1, the transducer 14 emits a signal, typically sound waves 16, that reflect off objects (i.e., fish, the bottom, or rocky structure) and returns to the transducer 14. The transducer 14 then compiles information from the reflected waves 16 to provide a mapping of the underwater objects.

When the boat 10 in FIG. 1 travels along the water, however, it may encounter shallow objects, such as debris or logs floating on the water or even stumps protruding upward from a muddy bottom. As a boat 10 travels quickly along the surface of the water, these objects may collide with the transducer 14, and the resulting collision may bring about expensive loss or damage.

Figure 2:
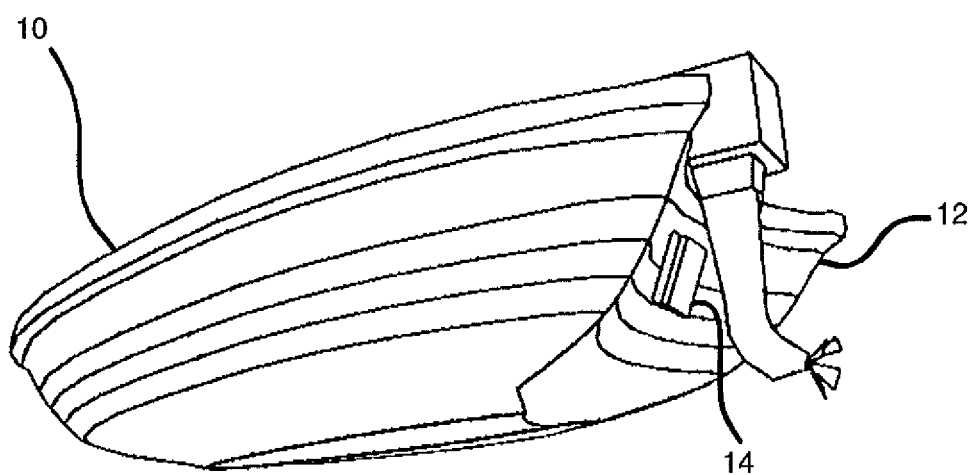
FIG. 2 shows a perspective view of the system attached to a hull of a vessel.

FIG. 2 shows a perspective view of a vessel, shown to be a fishing boat 10 having an outboard motor positioned near its hull 12. A transducer 14 may be mounted on the hull 12 of the boat 10, and should be positioned so that the transducer 14 will be at or near the water line.

Figure 3:
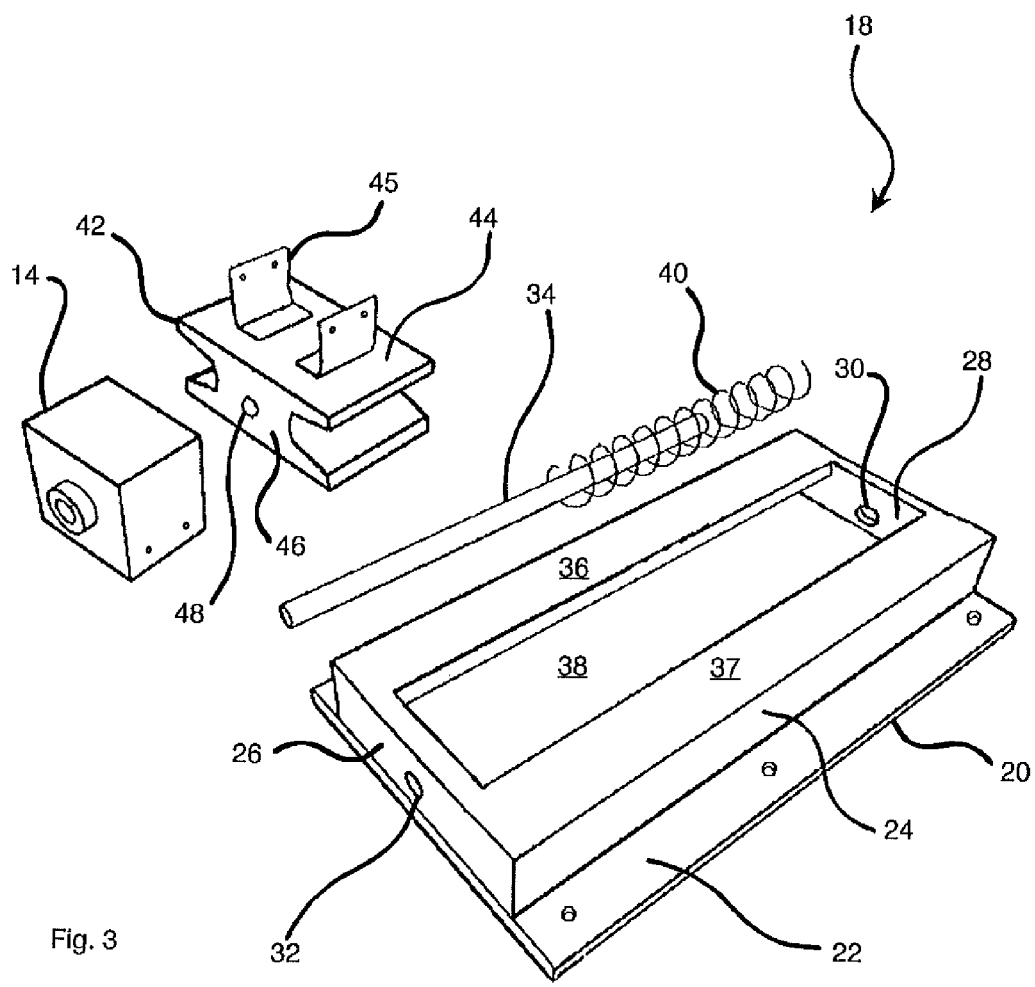
FIG. 3 shows an exploded and perspective view that details the component parts of the inventive system, according to the principles of the invention.

FIG. 3 is a perspective and exploded view detailing the parts of the inventive mounting system 18. The inventive mounting system 18 includes a bracket 20 having a base 22 a bottom wall 26, a top wall 28, and side walls 24. The top 28, bottom 26, and side walls 24 bound a void that forms a channel 38 along a longitudinal axis of the mounting system 18.

As shown in FIG. 3, a left inward flange 36 extends from one wall 24 and covers at least a portion of the void, and a right inward flange 37 extends from the other wall 24 and covers at least a portion of the void as well, leaving a channel 38 along the longitudinal axis of the mounting system 18.

Still referring to FIG. 3, the mounting system 18 will include a slide bracket 42 having an upper portion 44 and a lower portion 46. Additionally, an aperture 48 passes through the slide bracket 42, preferably near the lower portion 46 of the slide bracket 42. A pair of claws 45 extend from the upper portion 44 of the slide bracket 42, and each is configured to couple the transducer 14 to the slide bracket 42.

As shown in FIG. 3, the mounting system 18 will also include a rod 34 that will be positioned within the channel 38 such that a top end of the rod 34 engages within the top hole 30 formed on the top wall 28 and a bottom end of the rod 34 engages within the bottom hole 32 formed on the bottom wall 26. The rod 34 will also pass through the aperture 48 formed on the slide bracket 42. In this way, the slide bracket 42 is displaceable along the channel 38 by sliding along the rod 34 and the flanges 36, 37. A spring 40 may be positioned about the rod 34 and configured to bias the slide bracket 42 toward the bottom wall 26.

Figure 4:
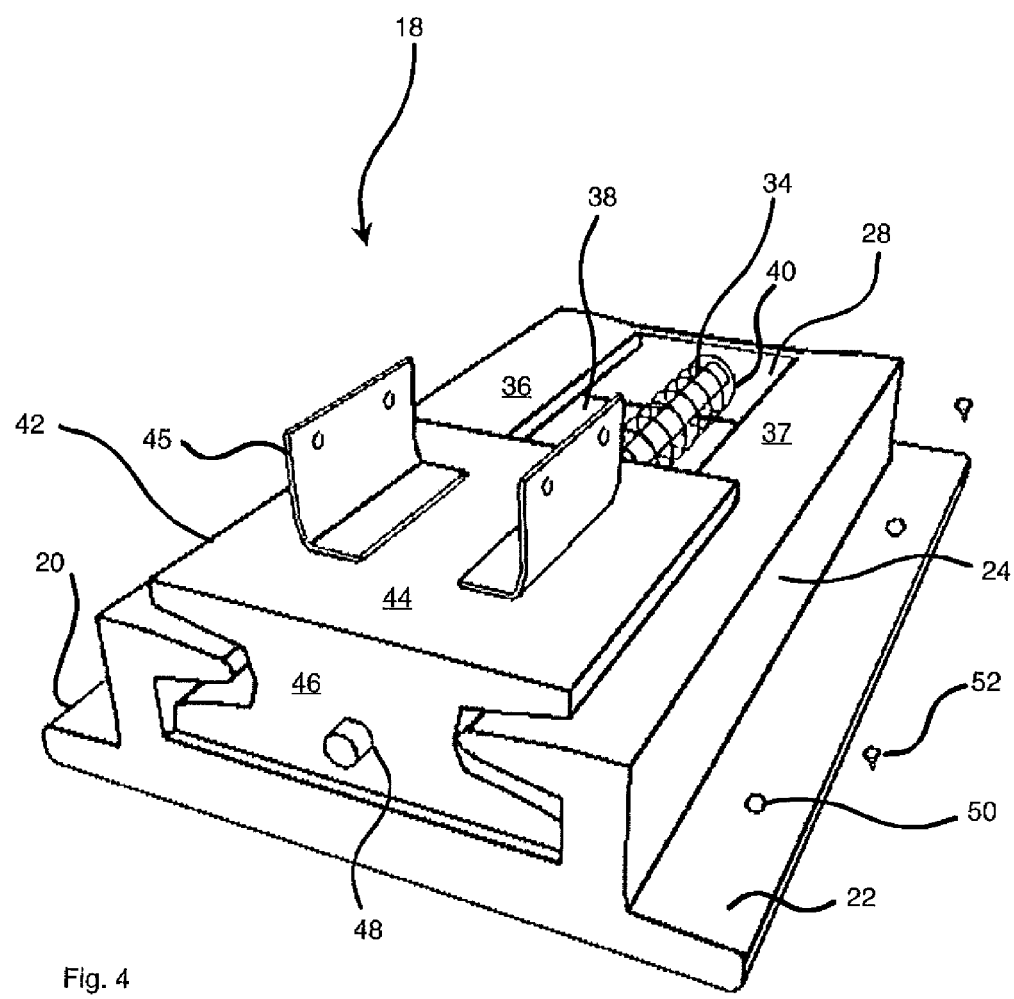
FIG. 4 shows a cross-sectioned and perspective view of the inventive system

FIG. 4 shows a cross-sectional and perspective view that details the relationship of the component parts of the mounting system 18. The mounting system 18 includes a bracket 20 having a base 22, side walls 24, and a top wall 28. The top wall 28 has a top hole 30 formed to receive a top end of the rod 34. A left flange 36 extends inwardly from one wall 24 and extends over at least a portion of the interior void, and a right flange 37 extends inwardly from the other wall 24 and extends over at least a portion of the interior void, thereby forming a channel 38 along the longitudinal axis of the mounting system 18.

As shown in FIG. 4, the rod 34 passes through the hollow of a compression spring 40, and also passes through the aperture 48 formed on the slide bracket 42. The slide bracket 42 is displaceable within the channel 38, and spring 40 biases the slide bracket 42 away from the top wall 28 and toward the bottom wall 26 (Not shown in FIG. 4, see FIG. 3).

The upper portion 44 of the slide bracket 42 and flanges 36, 37 are cooperatively formed to engage one another and allow relative movement of the slide bracket 42 within the channel 38; moreover, the rod 34 passing through the aperture 48 of the slide bracket 42 provides additional support and guidance to the slide bracket 42.

As shown in FIG. 4, the base 22 includes a plurality of screw holes 50. The mounting system 18 may be affixed to the surface of a vessel (see FIG. 2) by passing screws 52 through each screw hole 50 and into the surface of the vessel.

Still referring to FIG. 4, a pair of claws 45 extend from the upper portion 44 of the slide bracket 42. These claws 45, in turn engage and couple to a transducer 14 (see FIG. 3). In that regard, the claws 45 attached to the upper portion 44 may be provided by the respective manufacturer of the respective transducer 14. Many known transducers include mounting claws that are formed to attach directly to the surface of a vessel. The inventive system herein disclosed is well-suited to allow a manufacturer's mounting hardware to be affixed to the upper portion 44 of the slide bracket, thereby making the inventive system workable and compatible with systems that are already known in the art.

Although the present invention has been described and illustrated in detail, it is to be clearly understood that the same is by way of illustration and example only, and is not to be taken by way of limitation. The spirit and scope of the present invention are to be limited only by the appended claims that precisely define the metes and bounds of the invention.

I claim:

1. A system for mounting a transducer to a surface of a vessel, the system comprising:
    a base adapted to engage the surface of the vessel, the base having edges that define a longitudinal axis;
    a left side wall extending outwardly from a location adjacent a left edge of the base;
    a right side wall extending outwardly from a location adjacent a right edge of the base;
    a bottom wall extending outwardly from a location adjacent a bottom edge of the base, the bottom wall having a bottom hole positioned centrally thereon;
    a top wall extending outwardly from a location adjacent a top edge of the base, such that an interior void is bound by the base and the walls, the top wall having a top hole positioned centrally thereon;
    a left inward flange extending from a top of the left side wall, and at least partially covering the interior void;

a right inward flange extending from a top of the right side wall, and at least partially covering the interior void;

a channel formed in a space between the left inward flange and the right inward flange;

a slide bracket adapted to be displaceable within the channel, the slide bracket having an upper portion and a lower portion, the upper portion of the slide being formed to engage above the left flange and the right flange, the lower portion positioned within the void, the slide further including an aperture formed therein;

a rod having a top end and a bottom end, the top end of the rod being formed to fit within the top hole and the bottom end of the rod being formed to fit within the bottom hole, the rod being configured to pass through the aperture of the slide bracket and through the channel.

2. The system as in claim 1, further including:
a compression spring having a hollow center; wherein, the rod extends through the hollow center and biases the slide bracket toward the bottom wall.

3. The system as in claim 2, wherein a top of the spring engages the top wall and a bottom of the spring engages the slide bracket.

4. The system as in claim 1, further comprising a transducer positioned on the slide bracket.

5. The system as in claim 4, further comprising a pair of claws extending outwardly from the slide bracket; wherein the transducer is coupled to each of the pair of claws.

6. The system as in claim 1, further comprising
a plurality of screws;
a plurality of screw holes in the base; and wherein, the system is attached to the surface of the vessel by passing the screws through the holes and into the surface of the vessel.

7. The system as in claim 1, wherein the system comprises aluminum.

8. The system as in claim 1, further comprising a gasket positioned between the base and the surface of the vessel.

9. The system as in claim 5, wherein the claws extend from a top surface of the slide bracket.

10. A method of mounting a transducer to a surface of a vessel, the method including the steps of:
forming a base that is adapted to engage the surface of the vessel, the base having edges that define a longitudinal axis;
extending a left side wall outwardly from a location adjacent a left edge of the base;
extending a right side wall outwardly from a location adjacent a right edge of the base;
extending a bottom wall outwardly from a location adjacent a bottom edge of the base, the bottom wall having a bottom hole positioned centrally thereon;
extending a top wall outwardly from a location adjacent a top edge of the base; such that the extending steps form an interior void is bound by the base and the walls;
making a top hole in a central position on the top wall;
making a bottom hole in a central position on the bottom wall;
forming a left inward flange to extend from a top of the left side wall, and at least partially cover the interior void;
forming a right inward flange to from a top of the right side wall, and at least partially cover the interior void, thereby forming a channel in a space between the left inward flange and the right inward flange;
providing a slide bracket with an upper portion and a lower portion;
forming the upper portion of the slide to engage above the left flange and the right flange, the lower portion positioned within the void, the slide bracket further including an aperture formed therein;
providing a rod having a top end and a bottom end;
passing the rod through the channel by inserting the top end of the rod into the top hole and the bottom end of the rod being in the bottom hole.

11. The method as in claim 10, further including the step of passing the rod through a hollow center of a compression spring, thereby biasing the slide bracket toward the bottom wall.

12. The method as in claim 11, wherein a top of the spring engages the top wall and a bottom of the spring engages the slide bracket.

13. The method as in claim 10, further comprising the step of positioning a transducer on the slide bracket.

14. The method as in claim 13, further comprising the steps of
extending a pair of claws outwardly from the slide bracket; and coupling the transducer to each of the pair of claws.

15. The method as in claim 10, further comprising the steps of
providing a plurality of screws;
making a plurality of screw holes in the base; and
passing the screws through the holes and into the surface of the vessel.

* * * * *